United States Patent
Aoyama

(10) Patent No.: US 7,826,316 B2
(45) Date of Patent: Nov. 2, 2010

(54) OPTICAL DISC DRIVE AND METHOD FOR PROCESSING RECORDED DATA

(75) Inventor: Shohei Aoyama, Mito (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 525 days.

(21) Appl. No.: 11/904,503

(22) Filed: Sep. 26, 2007

(65) Prior Publication Data
US 2008/0205218 A1   Aug. 28, 2008

(30) Foreign Application Priority Data
Feb. 23, 2007   (JP) .............................. 2007-043964

(51) Int. Cl.
*G11B 7/00* (2006.01)
(52) U.S. Cl. ................. 369/44.32; 369/44.23; 369/53.1
(58) Field of Classification Search ................. None
See application file for complete search history.

(56) References Cited

U.S. PATENT DOCUMENTS

| | | | | |
|---|---|---|---|---|
| 5,864,523 | A * | 1/1999 | Yoshizawa | 369/44.23 |
| 5,864,524 | A * | 1/1999 | Sakaguchi | 369/44.21 |
| 6,545,958 | B1 * | 4/2003 | Hirai et al. | 369/44.32 |
| 2005/0152252 | A1 * | 7/2005 | Horimoto | 369/53.23 |
| 2006/0133245 | A1 * | 6/2006 | Saeki | 369/53.1 |
| 2007/0076536 | A1 * | 4/2007 | Shimizu | 369/30.23 |

FOREIGN PATENT DOCUMENTS

| | | |
|---|---|---|
| JP | 09-288823 | 11/1997 |
| JP | 10-143980 | 5/1998 |
| JP | 2006-344297 | 12/2006 |

OTHER PUBLICATIONS jp09-288823 English translation Optical disk recorder Apr. 11, 1997 Hashimoto Hirokuni.*
http://www.plextor.com/English/products/px-oe100e.html, 'PLEXTOR, PX-PX OE100E PlexEraser, 2007 2 pages.
"PLEXTOR", PX-PX OE100E PlexEraser product information available from http://www.plextor.com (Jan. 2007).

* cited by examiner

*Primary Examiner*—Van N Chow
(74) *Attorney, Agent, or Firm*—Townsend and Townsend and Crew LLP

(57) ABSTRACT

This invention provides a technique which ensures that if a recording error occurs in an optical disc, recorded data will be immediately erased from the disc without leaking to third parties. While recording data onto the optical disc, a controller judges whether the recording process has been executed to completion properly. If the recording process is judged to have failed, the controller will stop the recording process and activate an optical pickup to erase recorded data from the data-recording area on the optical disc by overwriting this area with required erasing data.

2 Claims, 2 Drawing Sheets

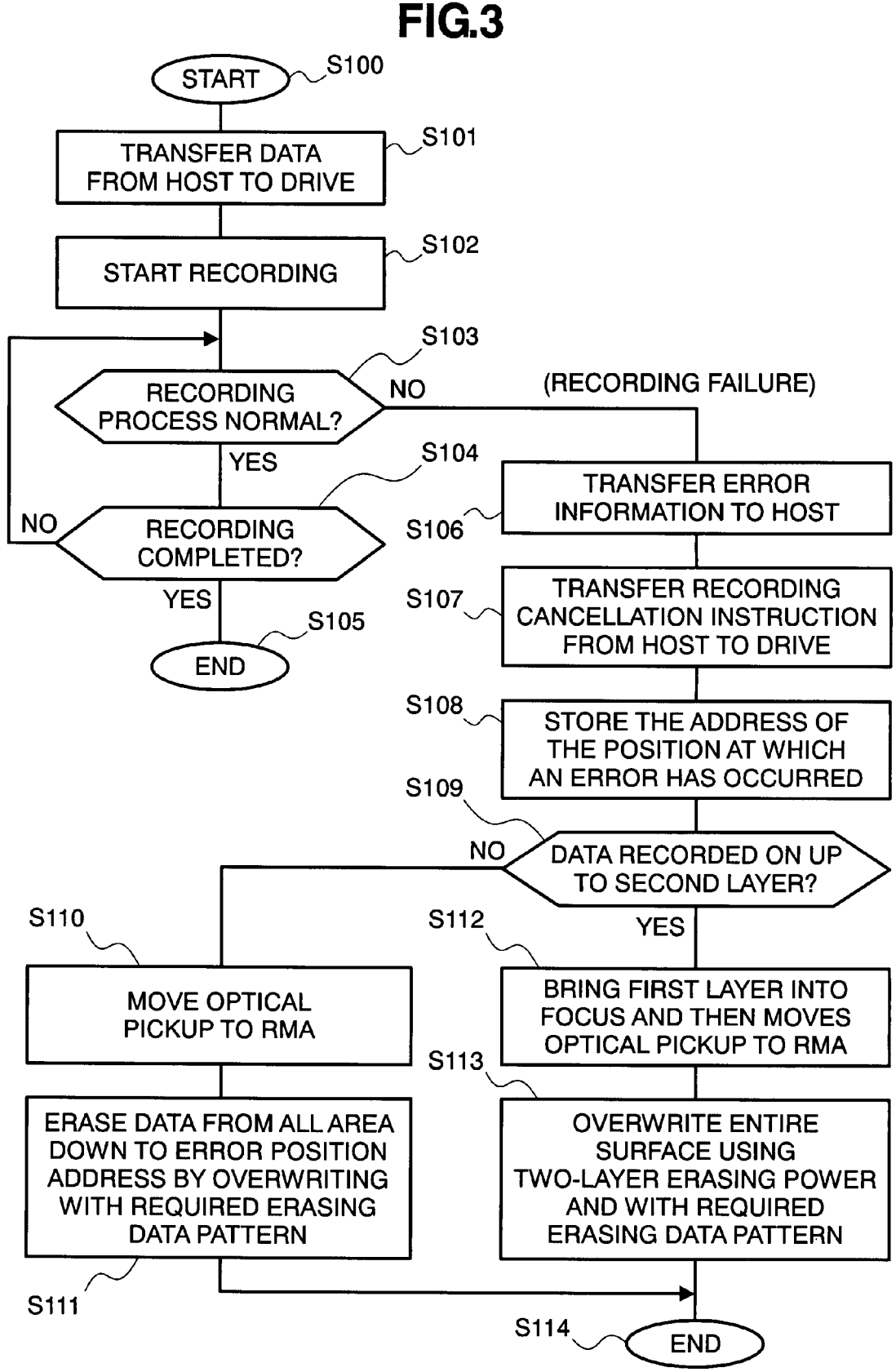

OPTICAL DISC DRIVE AND METHOD FOR PROCESSING RECORDED DATA

CLAIM OF PRIORITY

The present application claims priority from Japanese application serial No. JP 2007-043964, filed on Feb. 23, 2007, the content of which is incorporated by reference into this application.

BACKGROUND OF THE INVENTION (1) Field of the Invention

The present invention relates to an optical disc drive for recording data on a recordable optical disc, and more particularly to a technique for processing recorded data associated with a recording failure due to a physical defect present on a recording surface of an optical disc.

(2) Description of the Related Art

During recording with a conventional optical disc drive using a recordable optical disc such as a DVD-R, a physical defect on the recording surface of the optical disc can cause off-tracking or defocusing and may thus result in a recording failure. If this actually happens, the drive returns error information to the host apparatus that has instructed the drive to record. After receiving the error information, the host apparatus gives a recording cancellation command to the drive to stop recording on the optical disc. After this, the user performs either of the processes below to make no recorded data readable from the disc on which data recording has been stopped.

For example, it is described in JP-A-09-288823 that when recorded information is erased from the specified area on an optical disc, the information can be made unreadable by overwriting the corresponding area with required pattern data. Also, according to the PLEXTOR Internet information website named "PX-OE100E PLEXERASER Product Information" (URL:http://plextor.jp/product/pxoe100e/features.php), data present on the recording layer of an optical disc can be erased by irradiating the recording layer directly with laser light using a special data destruction device for disc data erasure. The two methods are both effective in that leakage of the data recorded on the disc can be prevented by rendering the disc data unreadable.

SUMMARY OF THE INVENTION

In the conventional method of processing associated with a recording failure, the recording step and the erasing step are executed separately from each other. That is to say, the disc itself that has caused the recording error is temporarily left unprocessed and the corresponding data is erased separately under the discretion of the user. There is no problem if the user immediately erases the data. To the user, however, the erasing operation is a troublesome task, so there has been the danger of the recorded data leaking to third parties if the disc is left unmanaged for that period of time.

An object of the present invention is to provide an optical disc drive and a method of data recording and processing, adapted so that if a recording error occurs in a disc, recorded data is immediately erased without leakage to third parties.

An aspect of the present invention is an optical disc drive for recording data on a recordable optical disc, and the drive includes a spindle motor that rotates the optical disc, an optical pickup that irradiates the optical disc with laser light to conduct recording, a pickup controller that controls an irradiating position of the optical pickup, and a controller that controls the optical disc recording process; wherein, while recording the data, the controller judges whether the recording process has been executed to completion properly, and if the recording process is judged to have failed, the controller stops the process and activates the optical pickup to erase the recorded data from an associated data area on the optical disc by overwriting the data area with required erasing data.

Another aspect of the present invention is a recording and processing method for recording data on a recordable optical disc, and the method includes: while recording the data by means of an optical pickup, judging whether the recording process has been executed to completion properly; and if the recording process is judged to have failed, stopping the process and activating the optical pickup to erase the recorded data from an associated data area on the optical disc by overwriting the data area with required erasing data.

BRIEF DESCRIPTION OF THE DRAWINGS

These and other features, objects and advantages of the present invention will become more apparent from the following description when taken in conjunction with the accompanying drawings, wherein:

FIG. 3 is a flowchart that shows a recording and processing method as another embodiment of the present invention.

DETAILED DESCRIPTION OF THE PREFERRED EMBODIMENTS

Hereunder, embodiments of the present invention will be described by using the accompanying drawings.

Figure 1:
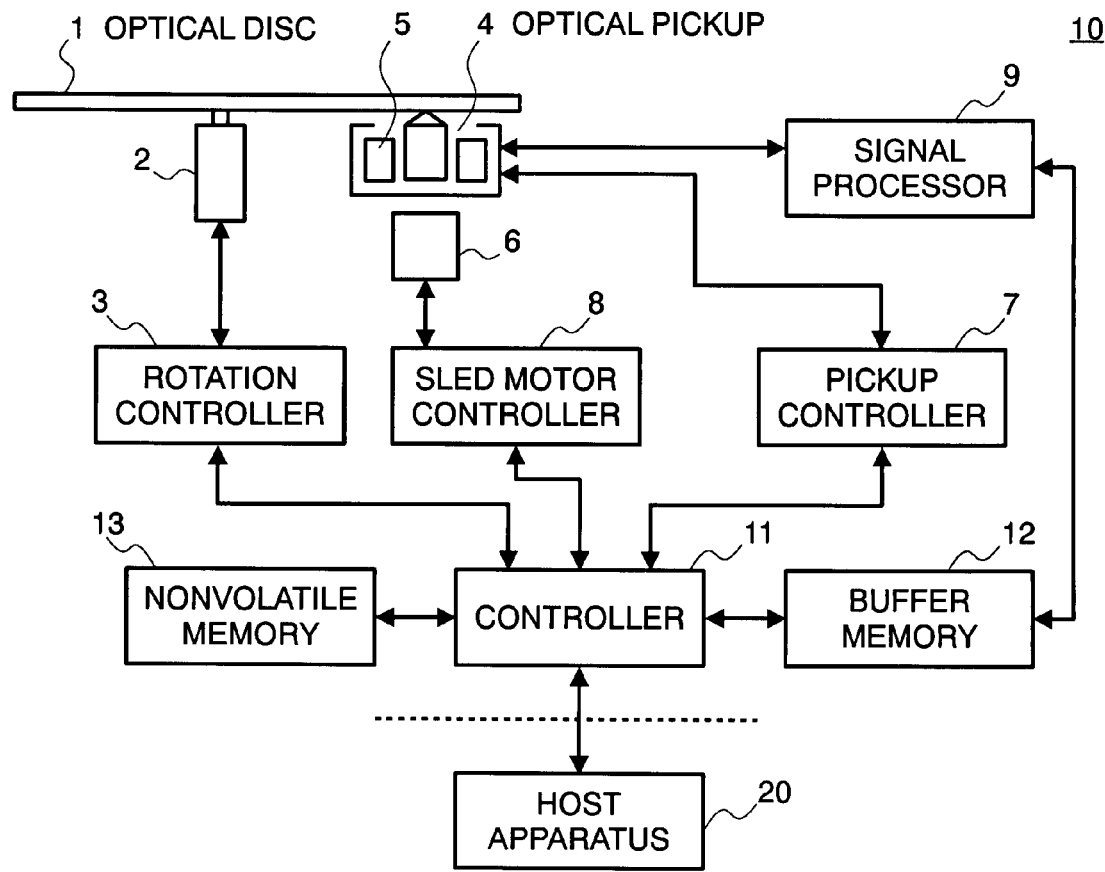
FIG. 1 is a block diagram showing an embodiment of an optical disc drive according to the present invention.

FIG. 1 is a block diagram showing an embodiment of an optical disc drive according to the present invention.

The optical disc drive 10 receives data from a host apparatus 20 and records the data on a recordable optical disc 1 such as a DVD-R (Digital Versatile Disc-Recordable). A spindle motor 2 rotationally drives the optical disc 1 mounted in the drive, and a rotation controller 3 controls the spindle motor 2. An optical pickup 4 irradiates the optical disc 1 with laser light in the form of a beam spot to execute recording or playback. An actuator 5 drives an objective lens (not shown) for control of focusing and tracking. The objective lens is mounted in the optical pickup 4. A sled motor 6 moves the optical pickup 4 to seek for a desired position in a radial direction of the optical disc 1, and a sled motor controller 8 controls the sled motor 6. A pickup controller 7 undertakes total control of the optical pickup 4, inclusive of the focusing and tracking control conducted for the actuator 5.

After receiving an output signal from the optical pickup 4, a signal processor 9 generates an RF signal, a focus error signal, a tracking error signal, or other signals. A controller 11 that controls the above-described sections during recording/playback includes constituent elements such as a CPU for executing control programs for each section, and a RAM for temporarily saving control data. A nonvolatile memory 13 is used to store various control programs and operating parameter data settings. The optical disc drive 10 exchanges data and commands with a personal computer or any other external apparatus (host 20) via an interface. A buffer memory 12 is provided to temporarily store the data transferred to/from the host apparatus 20.

The controller 11 in the optical disc drive 10 of the present embodiment judges whether the data-recording process has been executed to completion properly. If the recording process fails for a reason such as the presence of a physical defect on a recording surface of the disc, the controller 11 stops the recording process and then erases the recorded data from the disc by overwriting an associated data area with required erasing data to make the disc unreadable.

Figure 2:
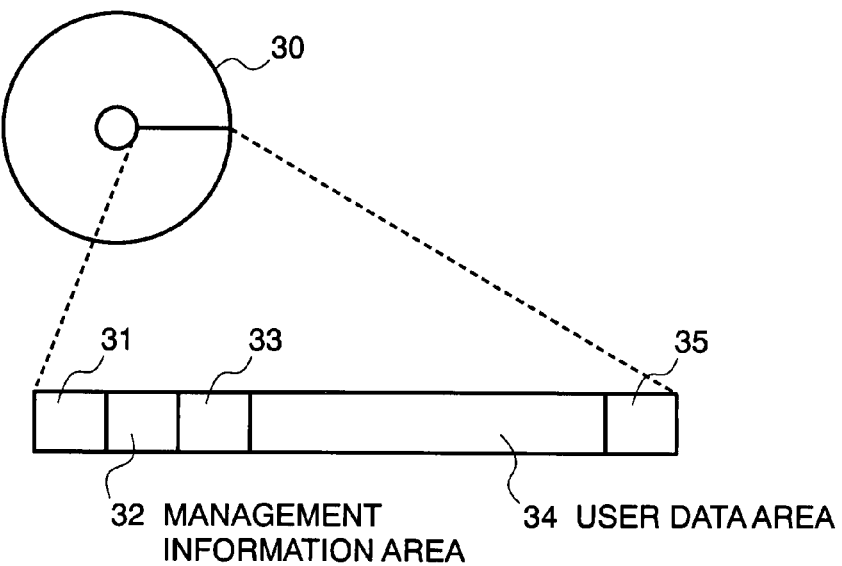
FIG. 2 is a diagram showing a recording area layout of a DVD-R.

FIG. 2 is a diagram showing a recording area layout of the DVD-R disc, an example of the recordable optical disc used in the present embodiment. The DVD-R disc 30 has, from the inner peripheral edge shown in FIG. 2, a power calibration area (PCA) 31 for conducting data write tests to determine recording power, a recording management information area (RMA) 32 for saving optical recording management information, a read-in area 33, a user data area 34 for user data recording, a read-out area 35, and the like. For a single-layer disc, the user data is recorded in order from an inner peripheral side of the user data area 34, towards an outer peripheral side thereof. Each time data is recorded, associated address information and others are recorded in RMA 32. During data readout, management information that has been saved in RMA 32 is referred to and a desired data position is accessed.

In the present embodiment, if recording fails, the controller 11 overwrites not only the data area 34, but also the recording management information area (RMA) 32, by erasing the data recorded in the former area and the management information saved in the latter area.

FIG. 3 is a flowchart that shows a recording and processing method as another embodiment of the present invention.

After a starting instruction for recording has been received from a user (step S100), a recording command and data to be recorded are transferred from the host 20 to the drive 10 (step S101). The drive 10, after receiving the data from the host 20, temporarily stores the received data into the buffer memory 12 and when a required amount of data is reached, starts recording on the optical disc 1 (step S102). While conducting the recording process, the drive 10 judges whether the data has been recorded properly (step S103). More specifically, the controller 11 judges whether the data sent from the host 20 has been successfully recorded in the desired position (specified address). If the recording process has been executed to completion properly, next data in the buffer memory 12 is recorded. Whether all received data has been successfully recorded is judged (step S104), and if all data has been successfully recorded, recording is completed (step S105).

After the start of this recording process, if the recording surface of the disc has physical defects or the like, this may cause unstable servo operation of the pickup controller 7 and result in off-tracking or defocusing. Consequently, data recording in the desired position may fail or the data may be erroneously recorded in a non-desired position. If these events actually occur, recording is judged not to have been properly executed (this indicates that a recording failure or a recording error has occurred). In this case, the controller 11 sends error information to the host 20 to indicate that the recording failure has occurred (step S106).

After receiving the error information, the host 20 instructs the drive 10 to stop the recording process (step S107), and as required, displays an error message to the user to indicate that the recording error has occurred. The controller 11 then stores the corresponding position address into the RAM or the like (step S108). The controller 11 recognizes the stored address as a maximum address of the area in which the user data has been recorded.

In addition, if the disc has a plurality of layers on the recording surface, a position of the current recording layer, that is, the layer where data recording has failed, is identified (step S109). If this layer is a starting layer of recording (i.e., if "No" in S109), the sled motor 6 is driven to move the optical pickup 4 to the recording management information storage area RMA 32 on the disc (step S110). After this, an erasing data pattern prestored within the nonvolatile memory 13 is read out and then used to erase the recorded user data by overwriting the user data area. The overwrite erasure from the RMA 32 is followed by overwrite erasure first from the read-in area 33 and then from the user data area 34. The controller 11 conducts the overwrite erasure from the user data area 34 while moving the optical pickup 4 from a starting address of the user data area 34 to the maximum address at which the error has occurred (step S111).

Processing in case of a failure occurring after data recording on a specific recording layer of a multiple-layered optical disc is described below. For example, after data recording on a first layer of a disc having two recording layers, if recording on a second layer fails halfway (i.e., if "Yes" in step S109), the actuator 5 is driven to bring the recorded first layer into focus and move the optical pickup 4 to the RMA 32 (step S112). Next, data is erased from the recording surfaces of the first and second layers at the same time. A laser power level for the simultaneous erasure is increased above that of the first layer only. The power level for the simultaneous erasure, prestored within the nonvolatile memory 13, is read out and set up when used. During the erasure, the entire disc surface is overwritten by using the overwrite erasure data pattern (step S113). Upon completion of the overwrite erasure, the recording process associated with the recording failure comes to an end (step S114).

An example of using two-layer simultaneous erasing power with focus placed upon the first layer has been described above, but this example does not limit the present invention. For instance, data present a plurality of recording layers may be erased with focus placed upon a middle layer or middle position of the recording layers. In this case, excessive enhancement of power is not required and the data on the plurality of layers can be erased efficiently.

According to the present embodiment, even if recording on the disc fails and a disc error occurs, the optical disc drive erases recorded data automatically to make data readout impossible. This makes it possible to reliably erase the data and prevent information leakage to third parties, without imposing the user's burdens of using an independent data-erasing device to erase the data or physically destroy the disc.

In addition, not only the user data in the user data area of the disc, but also the data in the recording management information area is erased during the overwrite erasure in the present embodiment. Since even the management information first read out after the disc was mounted is erased as a result, the disc itself becomes unrecognizable and the prevention of information leakage can be further strengthened.

According to the present invention, a disc on which data recording has failed can be properly processed to reliably prevent leakage of the recorded data to third parties without a burden of a user.

While we have shown and described several embodiments in accordance with our invention, it is to be understood that the disclosed embodiments are susceptible of changes and modifications without departing from the scope of the invention. Therefore, we do not intend to be bound by the details shown and described herein, but intend to cover all such changes and modifications that fall within the ambit of the appended claims.

What is claimed is:

1. An optical disc drive for recording data on a recordable optical disc, the drive comprising:
   a spindle motor that rotates the optical disc;

an optical pickup that irradiates the optical disc with laser light to conduct recording;
a pickup controller that controls an irradiating position of the optical pickup; and
a controller that controls the process of recording on the optical disc;
wherein, while recording the data at a specified address on the optical disc, the recording controller judges whether the recording process has been executed to completion properly, and if the recording process is judged to have failed, the recording controller stops the process and activates the optical pickup to erase the recorded data from the specified address on the optical disc by overwriting the data area with required erasing data,
wherein:
the optical disc has a plurality of recording layers; and
if, after recording data on a first layer of the optical disc, the recording controller judges a recording failure to have occurred during recording on a second layer, the recording controller focuses the optical pickup on the first layer and erases recorded data by overwriting the recording surfaces of the first and second layers at the same time at a required erasing power level.

2. A recording and processing method for recording data on a recordable optical disc, the method comprising:

while recording the data at a specified address on the optical disc by use of an optical pickup, judging whether the recording process has been executed to completion properly;
if a recording failure is judged to have occurred, stopping the process of recording the data on the optical disc; and
activating the optical pickup to erase recorded data from the specified address on the optical disc by overwriting with required erasing data,
wherein:
if the recording process is judged to have failed, a position on the optical disc where the recording failure has occurred is stored into a memory; and
recorded data is erased by overwriting the recording surface while moving the optical pickup from a recording management information area on the optical disc to the position on a user data area where the recording failure has occurred,
wherein:
the optical disc has a plurality of recording layers; and
after data recording on a first layer of the optical disc, if a recording failure is judged to have occurred during recording on a second layer, the optical pickup is focused on the first layer and recorded data is erased by overwriting the recording surfaces of the first and second layers at the same time at a required erasing power level.

* * * * *